(12) United States Patent
Zhang et al.

(10) Patent No.: US 11,504,915 B2
(45) Date of Patent: Nov. 22, 2022

(54) METHOD, SYSTEM, AND STORAGE MEDIUM FOR CONTROLLING FAST-MOVING PATH OF A PRINTER NOZZLE

(71) Applicant: Shanghai Fusion Tech Co., Ltd., Shanghai (CN)

(72) Inventors: Jinjing Zhang, Shanghai (CN); Jianzhe Li, Shanghai (CN); Hua Feng, Shanghai (CN)

(73) Assignee: Shanghai Fusion Tech Co., Ltd., Shanghai (CN)

(*) Notice: Subject to any disclaimer, the term of this patent is extended or adjusted under 35 U.S.C. 154(b) by 37 days.

(21) Appl. No.: 16/902,239

(22) Filed: Jun. 15, 2020

(65) Prior Publication Data

US 2021/0331416 A1    Oct. 28, 2021

(30) Foreign Application Priority Data

Apr. 22, 2020 (CN) .......................... 202010321376.8

(51) Int. Cl.
| | |
|---|---|
| *B29C 64/393* | (2017.01) |
| *B29C 64/209* | (2017.01) |
| *B29C 64/236* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/393* (2017.08); *B29C 64/209* (2017.08); *B29C 64/236* (2017.08); *B33Y 10/00* (2014.12); *B33Y 30/00* (2014.12); *B33Y 50/02* (2014.12)

(58) Field of Classification Search
CPC ............................................ B29C 64/386–393
See application file for complete search history.

(56) References Cited

U.S. PATENT DOCUMENTS

| | | | |
|---|---|---|---|
| 10,254,499 B1* | 4/2019 | Cohen | ....................... B23K 1/19 |
| 2013/0307193 A1* | 11/2013 | Johnson | ................. C09J 179/00 |
| | | | 264/401 |

(Continued)

FOREIGN PATENT DOCUMENTS

| | | |
|---|---|---|
| CN | 107471628 A | 12/2017 |
| CN | 108000866 A | 5/2018 |

(Continued)

*Primary Examiner* — Matthew J Daniels
*Assistant Examiner* — Andrew L Swanson
(74) *Attorney, Agent, or Firm* — Avek IP, LLC (57) ABSTRACT

Methods, systems, and storage media for controlling a fast-moving path of a printer nozzle. In some embodiments, a method for controlling fast movement of a printer nozzle includes the following steps. (1) Obtaining a start position and an end position. The start position is a position of a fast-moving start point of the printer nozzle, and the end position is a position of a fast-moving end point of the printer nozzle. (2) Determining an optimal fast-moving path on a horizontal plane corresponding to a slice of a print target according to the start position and the end position, so that a length of the fast-moving path outside a polygon in the slice is the shortest. (3) Controlling the printer nozzle to move relative to a base of the printer according to the optimal fast-moving path on the horizontal plane.

7 Claims, 10 Drawing Sheets

(56) References Cited

U.S. PATENT DOCUMENTS

| | | | |
|---|---|---|---|
| 2014/0252684 A1* | 9/2014 | Swanson | B29C 67/0055 |
| | | | 264/401 |
| 2016/0009029 A1* | 1/2016 | Cohen | B29C 67/0085 |
| | | | 264/493 |
| 2017/0173884 A1* | 6/2017 | Ryan | B29C 64/106 |
| 2019/0283329 A1* | 9/2019 | Lensgraf | B29C 64/112 |
| 2020/0147864 A1* | 5/2020 | Wood | B29C 64/209 |
| 2020/0147875 A1* | 5/2020 | Asgeirsson | B29C 64/209 |
| 2020/0361155 A1* | 11/2020 | Jones | B33Y 50/00 |

FOREIGN PATENT DOCUMENTS

| | | |
|---|---|---|
| CN | 108527838 A | 9/2018 |
| CN | 108544758 A | 9/2018 |
| CN | 109466057 A | 3/2019 |
| KR | 20200033356 A | 3/2020 |

\* cited by examiner

METHOD, SYSTEM, AND STORAGE MEDIUM FOR CONTROLLING FAST-MOVING PATH OF A PRINTER NOZZLE

CROSS REFERENCE TO RELATED APPLICATIONS

This application claims priority to Chinese application number 202010321376.8 filed on Apr. 22, 2020, the disclosure of which is incorporated by reference herein in its entirety.

FIELD OF THE DISCLOSURE

The disclosure relates generally to 3D printing technologies. More specifically, the disclosure relates to methods, systems, and storage media for controlling fast-moving paths of a printer nozzle.

BACKGROUND

In a traditional fused filament fabrication (FFF) process, an input print model file is first divided into multiple layers according to a specific layer thickness, with each layer corresponding to several polygons. Then, a nozzle movement trajectory is generated for these polygons based on a certain extrusion width. Such process is called slicing. In the common FFF printer slicing method, if a printer nozzle moves from one point to another at each layer without consumable extrusion, such movement is usually called fast movement. When the printer nozzle moves, due to the effect of gravity and the viscosity coefficient of the material itself, some molten materials in the nozzle overflows from the nozzle and generates a thin line. This phenomenon is called stringing. In some prior art, a retraction method is usually used to address the stringing problem. Here, retraction involves moving the consumables fed into the nozzle back at a high speed before fast-moving, so as to reduce the pressure and suppress the stringing caused by the gravity to some extent. Retraction can almost eliminate the stringing and overflow of the common hard materials such as PLA, ABS, PETG, PA, PP, PC, PEI, and PEEK. However, when the consumables are flexible materials or ductile materials, it is difficult to eliminate the stringing even through a long-distance retraction due to the low hardness of the materials and more distinct effect of gravity. As a result, many strings are left during printing with flexible materials, which affect the quality of a printed mode.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a method for controlling fast movement of a printer nozzle. The method includes the following steps. (1) Obtaining a start position and an end position. The start position is a position of a fast-moving start point of the printer nozzle, and the end position is a position of a fast-moving end point of the printer nozzle. (2) Determining an optimal fast-moving path on a horizontal plane corresponding to a slice of a print target according to the start position and the end position, so that a length of the fast-moving path outside a polygon in the slice is the shortest. (3) Controlling the printer nozzle to move relative to a base of the printer according to the optimal fast-moving path on the horizontal plane.

Optionally, step (2) further includes obtaining a first determining result by determining whether the start point and the end point are located in the same polygon.

Optionally, when the first determining result indicates that the start point and the end point are located in two different polygons, the method further includes the following steps.

Determining intersection points of a first virtual line segment and the two different polygons. The first virtual line segment is formed by the start point and the end point.

Determining a fast-moving path inside a start point polygon based on the start point and the intersection point of the first virtual line segment and the start point polygon. The start point polygon is a polygon in which the start point is located.

Determining a fast-moving path inside an end point polygon based on the end point and the intersection point of the first virtual line segment and the end point polygon. The end point polygon is a polygon in which the end point is located.

Determining a fast-moving path between the start point polygon and the end point polygon, so that the fast-moving path between the start point polygon and the end point polygon, located outside a polygon in a first pseudo security area, is the shortest. The first pseudo security area is an area not occupied by the start point polygon and the end point polygon on the horizontal plane.

Optionally, when the first determining result indicates that only one of the start point and the end point is located in a polygon, the method further includes the following steps.

Determining intersection points of a second virtual line segment and the polygon. The second virtual line segment is formed by the start point and the end point.

Determining a fast-moving path inside an endpoint polygon based on the intersection points and the start point or end point in the endpoint polygon. The endpoint polygon is a polygon in which the start point or the end point is located.

Determining a fast-moving path between the endpoint polygon and the end point or start point outside the endpoint polygon, so that the fast-moving path located outside a polygon in a second pseudo security area is the shortest. The second pseudo security area is an area not occupied by the endpoint polygon on the horizontal plane.

Optionally, when the first determining result indicates that the start point and the end point are inside the same polygon, the method further includes the following steps.

Determining intersection points of a third virtual line segment and a first security area in the same polygon and determining first virtual sub-segments by dividing the third virtual line with the intersection points. The third virtual line segment is formed by the start point and the end point, and the first security area is a wall area of the polygon.

If both endpoints of the first virtual sub-segment are located in the same first security area within a first security area set, determining that a fast-moving path between the two endpoints of the first virtual sub-segment is located in the same first security area. The first security area set is a set of wall areas of each polygon on the slice, and the endpoint is the intersection point, the start point, or the end point.

If the two endpoints of the first virtual sub-segment are located in different first security areas in the first security area set, determining intersection points of the first virtual sub-segment and a boundary of each first security area in the first security area set as sub-intersection points, and determining a fast-moving path between the two endpoints of the first virtual sub-segment based on a position relationship between adjacent points of the sub-intersection points and the endpoints.

If only one endpoint of the first virtual sub-segment is not within the first security area set, determining a fast-moving path between the endpoint not within the first security area set and a mapping point, and determining a fast-moving path between the mapping point and the other endpoint within the first security area set. The mapping point is a point within the first security area set that is closest to the endpoint not within the first security area set.

Optionally, when there is a grid line connecting the mapping point and the endpoint not within the first security area set, a shortest grid line connecting the mapping point and the endpoint not within the first security area set is used as the fast-moving path between the endpoint not within the first security area set and the mapping point. When there is no grid line connecting the mapping point and the endpoint not within the first security area set, a connection line between the mapping point and the endpoint not within the first security area set is used as the fast-moving path between the mapping point and the endpoint not within the first security area set.

Optionally, the method further includes the following steps.

Constructing an area not occupied by the start point polygon and the end point polygon on the horizontal plane as the first pseudo security area.

Obtaining an external moving start point by moving out an intersection point of the first virtual line segment and the start point polygon. The intersection point is close to a boundary of the end point polygon.

Obtaining an external moving end point by moving out an intersection point of the first virtual line segment and the end point polygon. The intersection point is close to a boundary of the start point polygon.

Determining an external fast-moving path between the external moving start point and the external moving end point in the first pseudo security area, so that the external fast-moving path outside a polygon in the first pseudo security area is the shortest.

In other embodiments, the disclosure provides a system for controlling fast movement of a printer nozzle. The system includes a moving position obtaining module and an optimal path determining module and is configured to control the printer nozzle to move relative to a base of the printer according to the optimal fast-moving path on the horizontal plane.

The moving position obtaining module is configured to obtain a start position and an end position. The start position is a position of a fast-moving start point of the nozzle, and the end position is a position of a fast-moving end point of the nozzle The optimal path determining module is configured to determine an optimal fast-moving path on a horizontal plane corresponding to a slice of a print target according to the start position and the end position, so that a length of the fast-moving path outside a polygon in the slice is the shortest.

In further embodiments, the disclosure provides a non-transitory computer-readable medium including a program, when executed by one or more processors, causing a computer to execute the flowing steps.

Obtaining a start position and an end position. The start position is a position of a fast-moving start point of a printer nozzle, and the end position is a position of a fast-moving end point of the printer nozzle.

Determining an optimal fast-moving path on a horizontal plane corresponding to a slice of a print target according to the start position and the end position, so that a length of the fast-moving path outside a polygon in the slice is the shortest.

Controlling the printer nozzle to move relative to a base of the printer according to the optimal fast-moving path on the horizontal plane.

BRIEF DESCRIPTION OF THE DRAWINGS

Illustrative embodiments of the disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
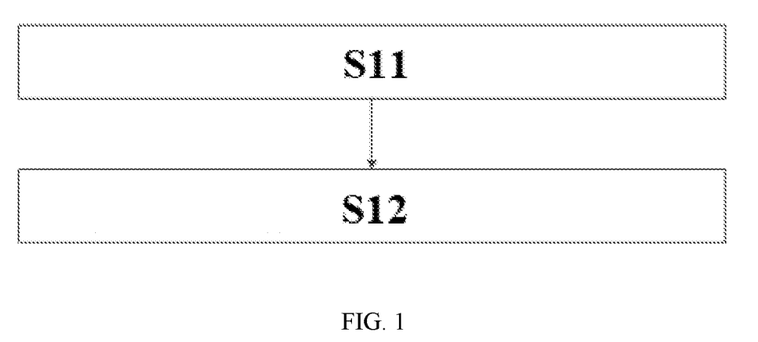
FIG. 1 is a flowchart illustrating a method for controlling a fast-moving path of a printer nozzle according to an embodiment of the disclosure.

FIG. 1 is a flowchart illustrating a method for controlling a fast-moving path of a printer nozzle according to an embodiment of the disclosure. As shown in FIG. 1, a control method may be used to control the movement of a printer nozzle relative to a base of a printer. The control method may include the following steps.

Step S11: Obtain a start position and an end position. The start position may be a position of a fast-moving start point of the nozzle, and the end position may be a position of a fast-moving end point of the nozzle.

Step S12: Determine an optimal fast-moving path on a horizontal plane corresponding to a slice of a print target according to the start position and the end position, so that a length of the fast-moving path outside a polygon in the slice is the shortest.

Figure 2:
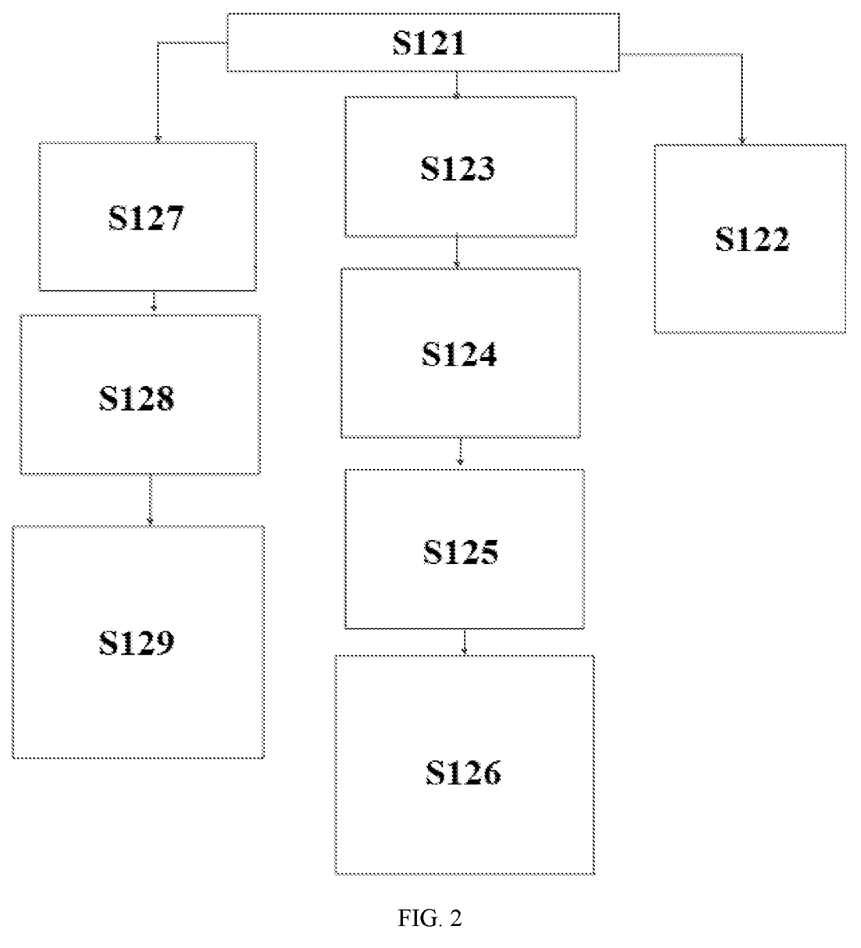
FIG. 2 is a flowchart illustrating a method for determining an optimal fast-moving path on a slice based on a start position and an end position according to an embodiment of the disclosure.

FIG. 2 is a flowchart illustrating a method for determining an optimal fast-moving path on a slice based on a start position and an end position according to an embodiment of the disclosure. As shown in FIG. 2, the step 12 of determining an optimal fast-moving path on a horizontal plane corresponding to a slice of a print target according to the start position and the end position as shown in FIG. 1 may include the following steps.

Step S121: Determine whether the start point and the end point are located in one polygon.

Step S122: When the start point and the end point are located in one polygon, determine the fast-moving path between the start point and the end point.

Step S123: When the start point and the end point are located in two different polygons, determine intersection points of a first virtual line segment formed by the start point and the end point and the two different polygons.

Step S124: Determine a fast-moving path inside the start point polygon based on the start point and the intersection point of the first virtual line segment and the start point polygon The start point polygon may be a polygon in which the start point is located.

Step S125: Determine a fast-moving path inside the end point polygon based on the end point and the intersection point of the first virtual line segment and the end point polygon. The end point polygon may be a polygon in which the end point is located.

Step S126: Determine a fast-moving path between the start point polygon and the end point polygon, so that the fast-moving path between the start point polygon and the end point polygon, located outside a polygon in a first pseudo security area, is the shortest. The first pseudo security area may be an area not occupied by each polygon on the horizontal plane.

Step S127: When only one of the start point and the end point is located in a polygon, determine intersection points of a second virtual line segment formed by the start point and the end point and the polygon.

Step S128: Determine a fast-moving path inside an endpoint polygon based on the intersection points and the start point or end point in the endpoint polygon. The endpoint polygon may be a polygon in which the start point or the end point is located.

Step S129: Determine a fast-moving path between the endpoint polygon and the end point or start point outside the endpoint polygon, so that the fast-moving path located outside a polygon in a second pseudo security area is the shortest. The second pseudo security area may be an area not occupied by each polygon on the horizontal plane.

In some embodiments, the step S122 of determining the fast-moving path between the start point and the end point when the start point and the end point are located in one polygon may include determining intersection points of a third virtual line segment formed by the start point and the end point and a first security area in the same polygon and each first virtual sub-segment obtained through division by the intersection points in the third virtual line segment. The first security area may be a wall area of the polygon.

If both endpoints of the first virtual sub-segment are located in the same first security area within a first security area set, determining that a fast-moving path between the two endpoints of the first virtual sub-segment is located in the same first security area. The first security area set may be a set of wall areas of each polygon on the slice, and the endpoints may be the intersection point, the start point, or the end point.

If the two endpoints of the first virtual sub-segment are located in different first security areas in the first security area set, determining intersection points of the first virtual sub-segment and a boundary of each first security area in the first security area set as sub-intersection points, and determining a fast-moving path between the two endpoints of the first virtual sub-segment based on a position relationship between any two adjacent points of the sub-intersection points and the endpoints.

If an endpoint (or only one endpoint) of the first virtual sub-segment is not within the first security area set, determining a fast-moving path between the endpoint not within the first security area set and a mapping point and a fast-moving path between the mapping point and the other endpoint within the first security area set. The mapping point may be a point within the first security area set that is closest to the endpoint not within the first security area set.

Further, the determining a fast-moving path between the endpoint not within the first security area set and a mapping point may include the following steps.

When there is a grid line connecting the mapping point and the endpoint not within the first security area set, using a shortest grid line connecting the mapping point and the endpoint not within the first security area set as the fast-moving path between the endpoint not within the first security area set and the mapping point.

When there is no grid line connecting the mapping point and the endpoint not within the first security area set, using a connection line between the mapping point and the endpoint not within the first security area set as the fast-moving path between the mapping point and the endpoint not within the first security area set.

In some embodiments, step S126 of determining a fast-moving path between the start point polygon and the end point polygon, so that the fast-moving path between the start point polygon and the end point polygon, located outside a polygon in a first pseudo security area, is the shortest may include the following steps.

Constructing the area other than the area occupied by each polygon on the horizontal plane as the first pseudo security area.

Moving out an intersection point, close to a boundary of the end point polygon, of the first virtual line segment and the start point polygon, to obtain an external moving start point.

Moving out an intersection point, close to a boundary of the start point polygon, of the first virtual line segment and the end point polygon, to obtain an external moving end point.

Determining an external fast-moving path between the external moving start point and the external moving end point in the first pseudo security area, so that the external fast-moving path outside a polygon in the first pseudo security area is the shortest.

Figure 3:
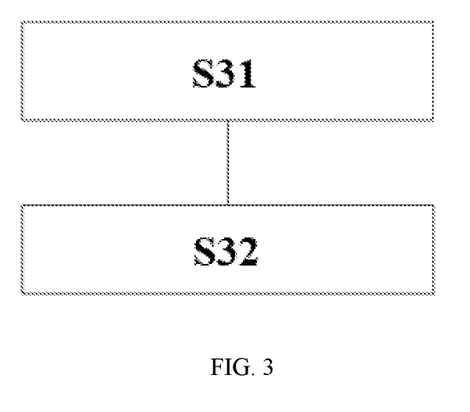
FIG. 3 is a structural block diagram illustrating a system for controlling a fast-moving path of a printer nozzle according to an embodiment of the disclosure.

FIG. 3 is a structural block diagram illustrating a system for controlling a fast-moving path of a printer nozzle according to an embodiment of the disclosure. As shown in FIG. 3, the control system may be used to control the movement of the printer nozzle relative to a base of a printer. The control system may include the following components.

A moving position obtaining module S31 configured to obtain a start position and an end position. The start position may be a position of a fast-moving start point of the nozzle, and the end position may be a position of a fast-moving end point of the nozzle.

An optimal path determining module S32 configured to determine an optimal fast-moving path on a horizontal plane corresponding to a slice of a print target according to the start position and the end position, so that a length of the fast-moving path outside a polygon is the shortest.

The disclosure may further provide a computer-readable storage medium including a program instruction that may be executed by a processor to control the moving of a printer nozzle relative to a printer base. The program may include the following steps.

Obtaining a start position and an end position. The start position may be a position of a fast-moving start point of the nozzle, and the end position may be a position of a fast-moving end point of the nozzle.

Determining an optimal fast-moving path on a horizontal plane corresponding to a slice of a print target according to the start position and the end position, so that a length of the fast-moving path outside a polygon in the slice is the shortest.

In some embodiments, printing a shoe upper may be used as examples to illustrate the disclosed methods, systems, and/or media. Here, a slice of a layer may be composed of multiple polygons for the layered upper model data. These polygons may be set according to slices, and a grid including several layers of outer walls, several layers of inner walls, and/or several filled path segments has been generated. The control method provided by the disclosure may be used to determine an optimal fast-moving path of the nozzle between any two points at a current layer. For ease of description, the method for determining an optimal fast-moving path in a security area is named a security area path method, and the fast-moving start point of the printer nozzle is denoted as A, and the fast-moving end point is denoted as B. The security area may include a first security area set and a set of grid areas of each polygon with grids. Position relationships between a polygon and the two points A and B may be illustrated in the following three cases.

Figure 4:
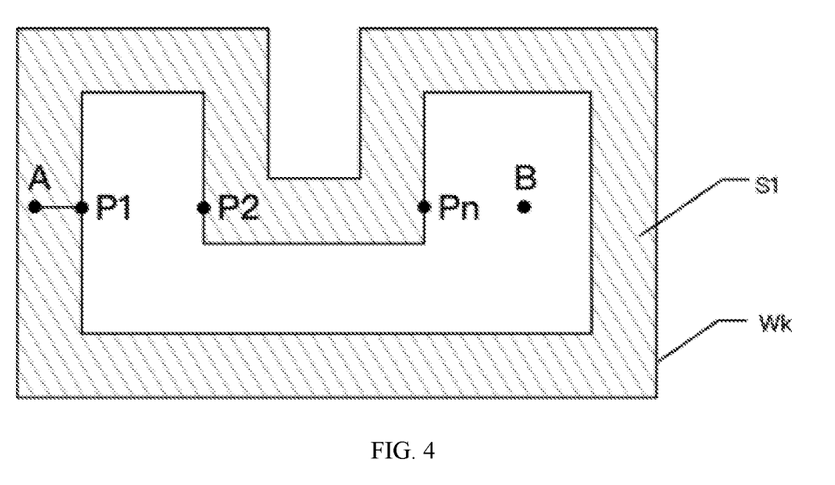
FIG. 4 is a schematic diagram illustrating an example of two points within one polygon according to an embodiment of the disclosure.

Case A: The two points A and B are inside one polygon. As shown in FIG. 4, the two points A and B are inside a polygon Wk.

(1) Denote a virtual line segment between the two points A and B, namely a third virtual line segment, as LAB, and determine all intersection points of the line segment LAB and a first security area S1 of the same polygon. The intersection points may be sequentially denoted as P1, P2, . . . , Pn. P1 is adjacent to point A, and Pn is adjacent to point B. Each line segment obtained through division by the intersection points in the third virtual line segment is denoted as a first virtual sub-segment, such as a first virtual sub-segment $I_{P_1P_2}$ between P1 and P2.

(2) Determine a fast-moving path from point A to point P1.

(a) If A is within the first security area set, a method (which will be described later) for calculating a path between any two points in the first security area set may be used to determine the fast-moving path between A and P1. As described above, the first security area set may be a set of wall areas of each polygon on the slice.

If both A and P1 are located in the same first security area within the first security area set, the fast-moving path between A and P1 is located in the same first security area. If A and P1 are located in different first security areas within the first security area set, determine intersection points of a first virtual sub-segment $I_{AP1}$ and a boundary of each first security area in the first security area set as sub-intersection points, and determine the fast-moving path between A and P1 based on a position relationship between two adjacent points of the sub-intersection points and endpoints of the first virtual sub-segment $I_{AP1}$.

Figure 5:
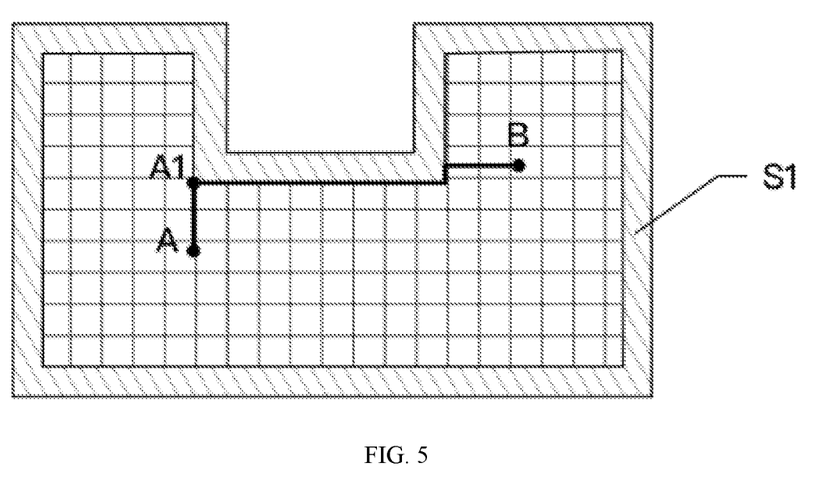
FIG. 5 is a schematic diagram illustrating an example of a grid path from A to A1 that may be found in a second security area according to an embodiment of the disclosure.
Figure 6:
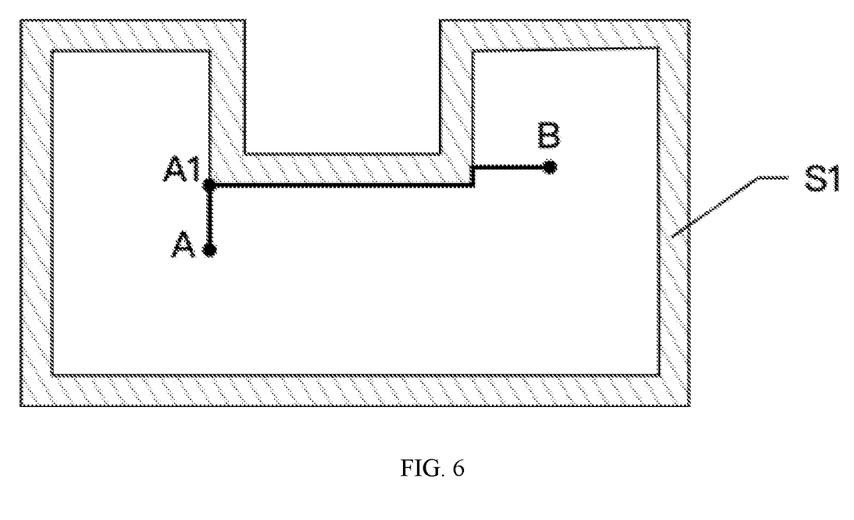
FIG. 6 is a schematic diagram illustrating an example of using a directly connected line segment as a fast-moving path from A to A1 according to an embodiment of the disclosure.

(b) As shown in FIG. 5 and FIG. 6, if A is not within the first security area set, determine the fast-moving path between A and P1 in two steps: finding a closest point A1 to A in the first security area set, which is denoted as a mapping point, and determining a fast-moving path between A and the mapping point A1 and a fast-moving path between the mapping point A1 and P1. As shown in FIG. 5, if a shortest grid path from A to A1 is found in a second security area by a grid path finding method (which will be described later), this shortest grid path may be used as the fast-moving path WA1 from A to A1; otherwise, as shown in FIG. 6, a line segment with A and A1 as the endpoints is used as the path WA1 from A to A1. Because both A1 and P1 are within the first security area set, the fast-moving path WA2 from A1 to P1 may be determined by a method (which will be described later) for calculating a path between any two points in the first security area set. The second security area is a set of grid areas of polygons with grids.

(3) Determine a fast-moving path from P(i) to P(i+1), where i≤n−1.

Because both P(i) and P(i+1) are within the first security area, determine the fast-moving path P(i) to P(i+1) by a method for calculating a path between any two points in the first security area.

(4) Determine a fast-moving path from Pn to B.

(a) If B is within the first security area set, the method for calculating a path between any two points in the first security area set may be used to determine the fast-moving path from Pn to B.

If both B and Pn are located in the same first security area within the first security area set, the fast-moving path from Pn to B is located in the same first security area. If Pn and B are located in different first security areas within the first security area set, determine intersection points of a first virtual sub-segment $I_{PnB}$ and a boundary of each first security area in the first security area set as sub-intersection points, and determine the fast-moving path between Pn and B based on a position relationship between adjacent points of the sub-intersection points and endpoints of the first virtual sub-segment $I_{PnB}$.

(b) If B is not within the first security area set, find a closest point B1 to B in the first security area set. If a shortest grid path from B to B1 may be found in the second security area by the grid path finding method, this shortest grid path may be used as the fast-moving path from B to B1; otherwise, a line segment with B and B1 as the endpoints is used as the path from B to B1. Because both Pn and B1 are within the first security area set, a fast-moving path WB2 from Pn to B1 may be determined by the method for calculating a path between any two points in the first security area set.

In some embodiments, the implementation process of the method for calculating a path between any two points in the first security area set may be as follows.

Assume that a first target point is m(i), a second target point is m(i+1), and a first virtual sub-segment formed by m(i) and m(i+1) is $I_{m_im_{i+1}}$.

(1) If m(i) and m(i+1) are in the same first security area within the first security area set, that is, in a sub-polygon M enclosed by boundaries of the first security area, determine a fast-moving path from m(i) to m(i+1) by a method for calculating a path between any two points in the same first security area in the first security area set. That is, if $I_{mimi+1}$ is within M, $I_{mimi+1}$ may be used as the fast-moving path from m(i) to m(i+1). If $I_{mimi+1}$ is partially outside M, determine the fast-moving path from m(i) to m(i+1) according to intersection points of $I_{mimi+1}$ and M. Starting from m(i), a line segment between m(i) or m(i+1) and its adjacent intersection point may be used as a corresponding fast-moving path. If the line segment between m(i) or m(i+1) and its adjacent intersection point is inside M, the line segment may be used as its corresponding fast-moving path. If the line segment between m(i) or m(i+1) and its adjacent intersection point is outside M, determine the corresponding fast-moving path on an edge of M, so that one of the intersection point is connected along the edge of M to a next intersection point.

(2) If m(i) and m(i+1) are in different first security areas in the first security area set, that is, in different sub-polygons, determine intersection points of $I_{mimi+1}$ and a boundary of each first security area in the first security area set. If m(i) or m(i+1) and its adjacent intersection point are in the same first security area, the method for calculating a path between any two points in the same first security area in the first security area set may be used to determine a fast-moving path from m(i) or m(i+1) to the adjacent intersection point. If m(i) or m(i+1) and its adjacent intersection point are located in different first security areas, the grid path finding method may be used to determine a fast-moving path from m(i) or m(i+1) to its adjacent intersection point. Similarly, if adjacent intersection points are in the same first security area, the method for calculating a path between any two points within the same first security area in the first security area set may be used to determine a fast-moving path between the adjacent intersection points. If adjacent intersection points are located in different first security areas, the grid path finding method may be used to determine a fast-moving path between the adjacent intersection points.

In some embodiments, the implementation process of the grid path finding method may be as follows.

Assume that a third target point G(i) is located in a first security area Mi in the first security area set, a fourth target point G(i+1) is located in another first security area M(i+1) in the first security area set, and a first virtual sub-segment formed by G(i) and G(i+1) is $I_{GiG+1}$.

Find grid lines connecting Mi and M(i+1) in grids of the second security area. If multiple grid lines are found, a shortest grid line may be used as a fast-moving path between G(i) and G(i+1). If only one grid line is found, it may be used as the fast-moving path between G(i) and G(i+1).

If no grid line connecting Mi and M(i+1) is found in the grids of the second security area, construct an undirected graph (V, E) with all the first security areas in the first security area set as vertices, calculate a shortest distance between the first security areas Mi and M(i+1) according to the undirected graph, and a path corresponding to the shortest distance may be used as the fast-moving path between G(i) and G(i+1). The steps may be as follows.

Construct the undirected graph (V, E) with all the first security areas in the first security area set as vertices. If there is any grid line connecting two first security areas, a shortest grid line connecting the two first security areas may be used as an edge, and a length of the edge as a weight. If one first security area is inside another first security area, and a minimum distance between the first security area located inside and the first security area located outside is less than a threshold, determine that the two first security areas are nested. Optionally, if either of the following two conditions is met, the two first security areas may be defined as nested: (1) The two first security areas overlap; and (2) A first security area M is inside a first security area W, and a closest point of the first security area M to the first security area W is less than a threshold. The threshold may be set to a thickness of an outer wall, a nozzle diameter, or an extrusion width. Because the two first security areas nested with each other do not need to pass through the grid lines, the weight of the edges of the two first security areas is 0. Then the Floyd-Warshall method may be used to calculate the shortest distance between the first security areas Mi and M(i+1) based on the undirected graph (V, E) and the weight, and the path corresponding to the shortest distance may be used as the fast-moving path between the first security areas Mi and M(i+1).

Figure 7:
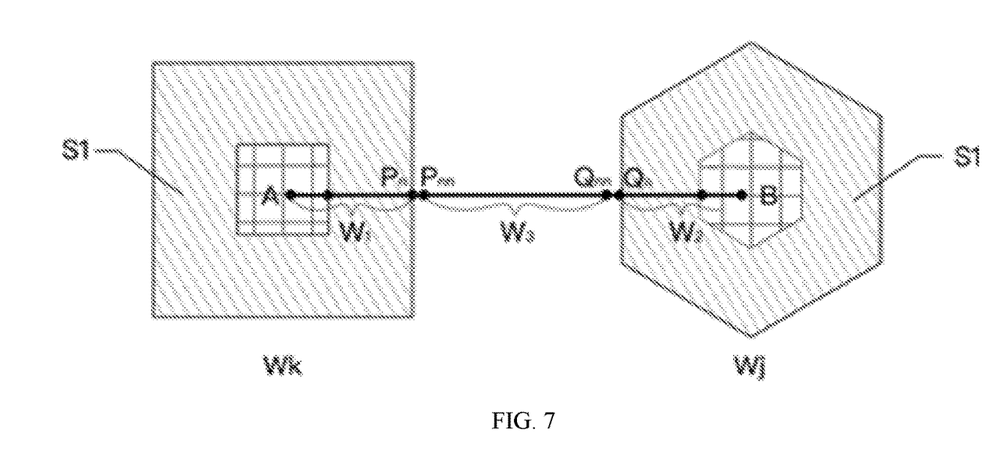
FIG. 7 is a schematic diagram illustrating an example of two points within different polygons according to an embodiment of the disclosure.

Case B: The two points A and B are inside different polygons. As shown in FIG. 7, A is inside a polygon Wk and B is inside a polygon Wj.

When points A and Pn are inside the same polygon Wk, the method in Case A may be used to determine a fast-moving path W1 between the points A and Pn.

When points B and Qn are inside the same polygon Wj, the method in Case A may be used to determine a fast-moving path W2 between the points B and Qn.

Move Pn out to Pnn so that the point Pnn is outside the polygon Wk. Move Qn out to Qnn so that the point Qnn is outside the polygon Wj. Then, a path finding method for points outside a polygon may be used to determine a fast-moving path W3 between the polygon Wk and the polygon Wj, which may include constructing a first pseudo security area Sw. The first pseudo security area may be an area not occupied by each polygon on the horizontal plane. The pseudo security area Sw may include multiple polygons without a grid line inside, that is, no second security area exists in an area enclosed by the outline of the first pseudo security area Sw. After the above processing, both Pnn and Qnn are located inside the pseudo security area Sw. The security area path method may be used to determine a fast-moving path between Pnn and Qnn, and the fast-moving path may be used as the fast-moving path between the polygons Wk and Wj.

Figure 8:
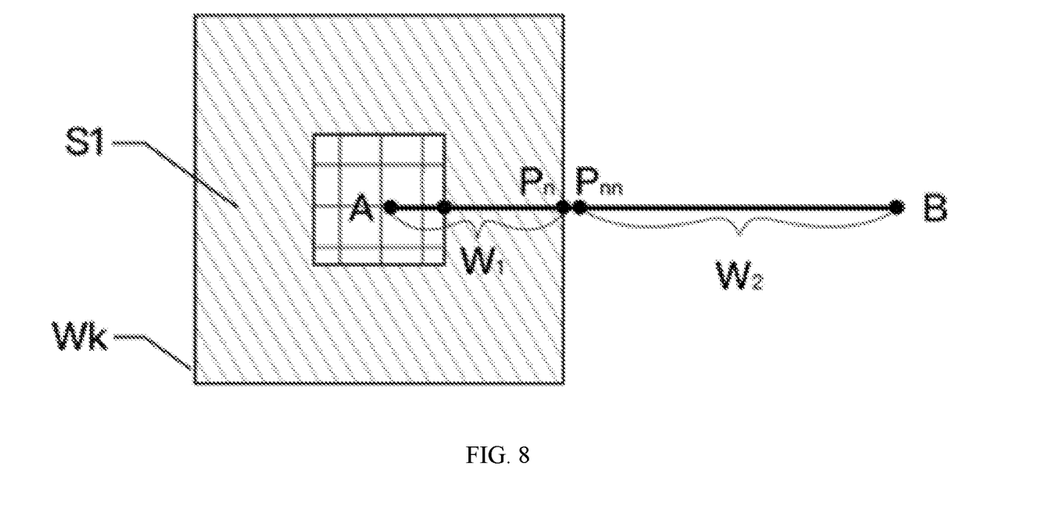
FIG. 8 is a schematic diagram illustrating an example of only one of two points within a polygon according to an embodiment of the disclosure.

Case C: Only one of the two points A and B are inside the polygon. As shown in FIG. 8, A is located inside the polygon Wk, and B is located outside the polygon Wk.

When points A and Pn are inside the same polygon Wk, the method in Case A may be used to determine a fast-moving path between the points A and Pn.

Move Pn out to Pnn so that the point Pnn is outside the polygon Wk. Then, the path finding method for points outside a polygon may be used to determine a fast-moving path between Pnn and B.

Figure 9:
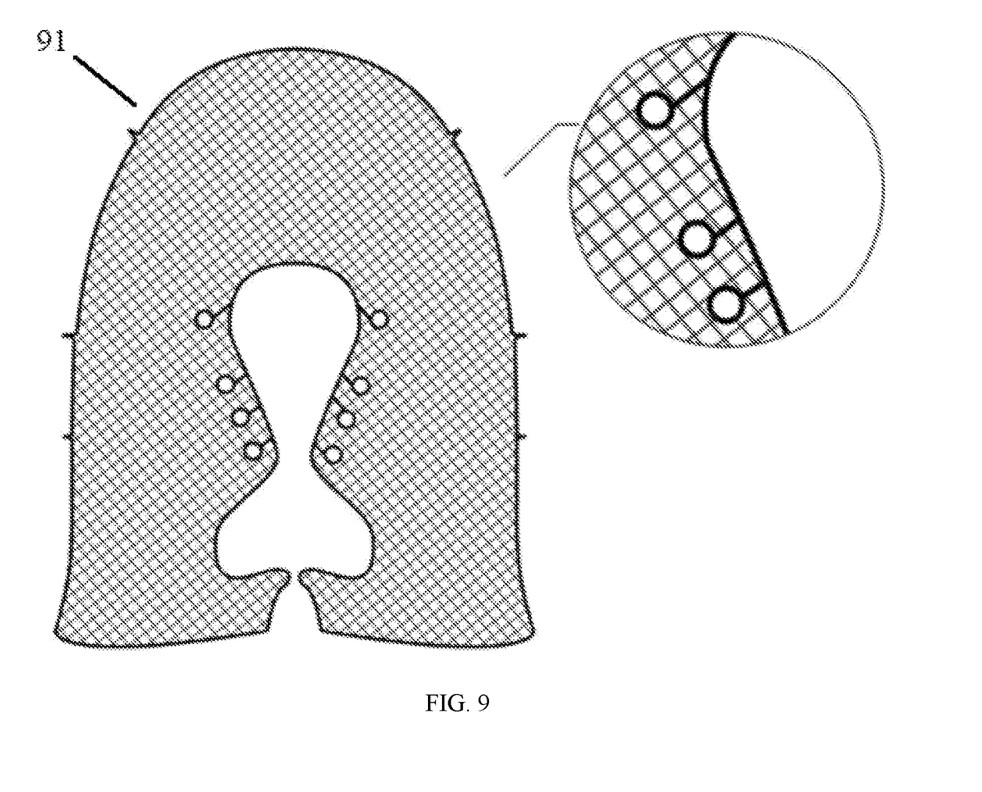
FIG. 9 is a diagram illustrating an example of a shoe upper slice after an upper printing procedure is processed by a control method according to an embodiment of the disclosure.
Figure 10:
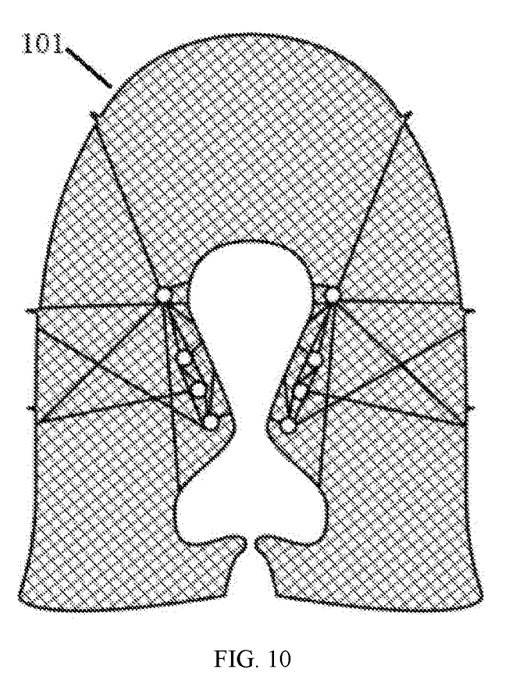
FIG. 10 is a diagram illustrating an example of a shoe upper slice when an upper printing procedure is not processed by a control method according to an embodiment of the disclosure.

FIG. 9 is a diagram illustrating an example of a shoe upper slice 91 after an upper printing procedure is processed by a control method according to an embodiment of the disclosure. FIG. 10 is a diagram illustrating an example of a shoe upper slice 101 when an upper printing procedure is not processed by a control method according to an embodiment of the disclosure. It may be seen from the FIGS. 9 and 10 that, the control method provided by the disclosure may significantly reduce stringing caused by the fast movement of the nozzle and effectively improve the print quality of the printed model in printing with flexible materials.

Various embodiments of the disclosure may have one or more of the following effects.

In some embodiments, the disclosure may provide a method, a system, and a storage medium for controlling a fast-moving path of a printer nozzle, which may help to make the fast-moving path move as far as possible along a printing path that has been or will be generated on a horizontal plane corresponding to a slice so that a length beyond the printing path may be the shortest. The disclosure may help to effectively reduce the effect of stringing on the print quality of the printed model In other embodiments, the disclosure may determine an optimal fast-moving path on the horizontal plane corresponding to the slice of the print target according to a fast-moving start position and a fast-moving end position of the nozzle, so that a length of the fast-moving path outside a polygon is the shortest.

In further embodiments, assuming that the fast-moving start point is point A and the fast-moving end point is point B, the control method, control system, and computer-readable storage medium disclosed may help to make a fast-moving path from point A to point B move as far as possible along a printing path that has been or will be generated on a horizontal plane corresponding to a slice so that a length beyond the printing path is the shortest.

In some embodiments, the impact of stringing on the print quality of the printed model may be effectively reduced when printing with flexible materials because the length of the fast-moving path beyond the printing path may be the shortest.

In other embodiments, the disclosure may provide a method for controlling a fast-moving path of a printer nozzle, which may determine an optimal fast-moving path on a horizontal plane corresponding to a slice of a print target according to a fast-moving start position and a fast-moving end position of the nozzle, so that a length of the fast-moving path outside a polygon is the shortest. Assuming that the fast-moving start point is point A and the fast-moving end point is point B. The control methods, control systems, and computer-readable storage media as disclosed may make a fast-moving path from point A to point B move as far as possible along a printing path that has been or will be generated on a horizontal plane corresponding to a slice, so that a length beyond the printing path is the shortest.

In further embodiments, the impact of stringing on the print quality of a printed model may be effectively reduced in printing flexible materials because the length of the fast-moving path beyond the printing path is the shortest.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A method for printing a target file, comprising the steps of:
   providing a fused filament fabrication printer comprising a printer nozzle, a controller, and a printer base; and
   providing a flexible or ductile printing material; and
   using the controller to cause the printer to perform the following steps:
   (1) dividing an input print model file of the print target into multiple slices by the controller, each slice corresponding to one or more polygons, wherein the one or more polygons are areas where a printing material is printed;
   (2) obtaining a start position and an end position by the controller, wherein the start position is a position of a fast-moving start point of the printer nozzle, and the end position is a position of a fast-moving end point of the printer nozzle;
   (3) determining a fast-moving path on a horizontal plane corresponding to a slice of a print target according to the start position and the end position by the controller, so that a length of the fast-moving path outside a polygon in the slice is the shortest, thereby reducing stringing; and
   (4) printing an entire slice of the print target by the nozzle and keep repeating steps (2)-(3) when printing each slice until the print target is finished;
   wherein:
   step (3) further comprises obtaining a first determining result by determining whether the start point and the end point are located in the same polygon; and
   the first determining result indicates at least one situation selected from the group consisting of: the start point and the end point are inside a same polygon, the start point and the end point are located in two different polygons, and only one of the start point and the end point is located in a polygon;
   when there is a grid line connecting a mapping point and an endpoint not within a first security area set and when the start point and the end point are inside the same polygon, a shortest grid line connecting the mapping point and the endpoint not within the first security area set is used as the fast-moving path between the endpoint not within the first security area set and the mapping point;
   when there is no grid line connecting the mapping point and the endpoint not within the first security area set and when the start point and the end point are inside the same polygon, a connection line between the mapping point and the endpoint not within the first security area set is used as the fast-moving path between the mapping point and the endpoint not within the first security area set; and
   the grid line is in a second security area and the grid line connects a first security area to another first security area in the first security area set.

2. The control method according to claim 1, wherein:
   when the first determining result indicates that the start point and the end point are located in two different polygons, the method further comprises the steps of:
   determining intersection points of a first virtual line segment and the two different polygons, wherein the first virtual line segment is formed by the start point and the end point;
   determining a fast-moving path inside a start point polygon based on the start point and the intersection point of the first virtual line segment and the start point polygon, wherein the start point polygon is a polygon in which the start point is located;

determining a fast-moving path inside an end point polygon based on the end point and the intersection point of the first virtual line segment and the end point polygon, wherein the end point polygon is a polygon in which the end point is located; and determining a fast-moving path between the start point polygon and the end point polygon, so that the fast-moving path between the start point polygon and the end point polygon, located outside a polygon in a first pseudo security area, is the shortest, wherein the first pseudo security area is an area not occupied by the start point polygon and the end point polygon on the horizontal plane.

3. The control method according to claim 1, wherein:

when the first determining result indicates that only one of the start point and the end point is located in a polygon, the method further comprises the steps of:

determining intersection points of a second virtual line segment and the polygon, wherein the second virtual line segment is formed by the start point and the end point;

determining a fast-moving path inside an endpoint polygon based on the intersection points and the start point or end point in the endpoint polygon, wherein the endpoint polygon is a polygon in which the start point or the end point is located; and determining a fast-moving path between the endpoint polygon and the end point or start point outside the endpoint polygon, so that the fast-moving path located outside a polygon in a second pseudo security area is the shortest, wherein the second pseudo security area is an area not occupied by the endpoint polygon on the horizontal plane.

4. The control method according to claim 2, wherein the method further comprises the steps of:

constructing an area not occupied by the start point polygon and the end point polygon on the horizontal plane as the first pseudo security area;

obtaining an external moving start point by moving out a first intersection point of the first virtual line segment and the start point polygon, wherein the first intersection point is closer to a boundary of the end point polygon than to a boundary of the start point polygon;

obtaining an external moving end point by moving out a second intersection point of the first virtual line segment and the end point polygon, wherein the second intersection point is closer to the boundary of the start point polygon than to the boundary of the end point polygon; and determining an external fast-moving path between the external moving start point and the external moving end point in the first pseudo security area, so that the external fast-moving path outside a polygon in the first pseudo security area is the shortest.

5. The control method according to claim 1, wherein:

when the first determining result indicates that the start point and the end point are inside the same polygon, the method further comprises the steps of:

determining intersection points of a third virtual line segment and the first security area in the same polygon, and determining first virtual sub-segments by dividing the third virtual line with the intersection points, wherein:

the third virtual line segment is formed by the start point and the end point, and the first security area is a wall area of the polygon;

if both ends of a first virtual sub-segment are located in the same first security area within the first security area set, determining that a fast-moving path between the two ends of the first virtual sub-segment is located in the same first security area, wherein the first security area set is a set of wall areas of each polygon on the slice, and the end is the intersection point, the start point, or the end point;

if the two ends of the first virtual sub-segment are located in different first security areas in the first security area set, determining intersection points of the first virtual sub-segment and a boundary of each first security area in the first security area set as sub-intersection points, and determining a fast-moving path between the two ends of the first virtual sub-segment based on a position relationship between adjacent points of the sub-intersection points and the endpoints; and if only one end of the first virtual sub-segment is not within the first security area set, determining a fast-moving path between the end not within the first security area set and a mapping point, and determining a fast-moving path between the mapping point and the other end within the first security area set, wherein the mapping point is a point within the first security area set that is closest to the end not within the first security area set.

6. A method for printing a target file, comprising the steps of:

providing a fused filament fabrication printer comprising a printer nozzle, a controller, and a printer base; and providing a flexible or ductile printing material; and using the controller configured to cause the printer to perform the following steps:

dividing an input print model file of the print target into multiple slices by the controller, each slice corresponding to one or more polygons, wherein the one or more polygons are areas where a printing material is printed;

obtaining a start position and an end position by the controller, wherein the start position is a position of a fast-moving start point of the printer nozzle, and the end position is a position of a fast-moving end point of the printer nozzle;

determining a fast-moving path on a horizontal plane corresponding to a slice of a print target according to the start position and the end position by the controller, so that a length of the fast-moving path outside a polygon in the slice is the shortest; and printing an entire slice of the print target by the controller and keep repeating the step of obtaining the start position and the end position and the step of determining the fast-moving path when printing each slice until the print target is finished;

wherein:

the step of determining the fast moving path further comprises obtaining a first determining result by determining whether the start point and the end point are located in the same polygon; and when the first determining result indicates that the start point and the end point are inside the same polygon, the method further comprises the steps of:

determining intersection points of a third virtual line segment and a first security area in the same polygon, and determining first virtual sub-segments by dividing the third virtual line with the intersection points, wherein:
    the third virtual line segment is formed by the start point and the end point, and
    the first security area is a wall area of the polygon;
if both ends of a first virtual sub-segment are located in the same first security area within a first security area set, determining that a fast-moving path between the two ends of the first virtual sub-segment is located in the same first security area, wherein the first security area set is a set of wall areas of each polygon on the slice, and the end is the intersection point, the start point, or the end point;
if the two ends of the first virtual sub-segment are located in different first security areas in the first security area set, determining intersection points of the first virtual sub-segment and a boundary of each first security area in the first security area set as sub-intersection points, and determining a fast-moving path between the two ends of the first virtual sub-segment based on a position relationship between adjacent points of the sub-intersection points and the ends; and
if only one end of the first virtual sub-segment is not within the first security area set, determining a fast-moving path between the end not within the first security area set and a mapping point, and determining a fast-moving path between the mapping point and the other end within the first security area set, wherein the mapping point is a point within the first security area set that is closest to the end not within the first security area set.

7. A method for printing a target file, comprising the steps of:
    providing a fused filament fabrication printer comprising a printer nozzle, a controller, and a printer base; and
    providing a flexible or ductile printing material; and
    using the controller configured to cause the printer to perform the following steps:
        dividing an input print model file of the print target into multiple slices by the controller, each slice corresponding to one or more polygons, wherein the one or more polygons are areas where a printing material is printed;
        obtaining a start position and an end position by the controller, wherein the start position is a position of a fast-moving start point of the printer nozzle, and the end position is a position of a fast-moving end point of the printer nozzle;
        determining a fast-moving path on a horizontal plane corresponding to a slice of a print target according to the start position and the end position by the controller, so that a length of the fast-moving path outside a polygon in the slice is the shortest; and
        printing an entire slice of the print target by the nozzle and keep repeating the step of obtaining the start position and the end position and the step of determining the fast-moving path when printing each slice until the print target is finished;
wherein:
    the step of determining the fast moving path further comprises obtaining a first determining result by determining whether the start point and the end point are located in the same polygon;
    when the first determining result indicates that the start point and the end point are located in two different polygons, the method further comprises the steps of:
        determining intersection points of a first virtual line segment and the two different polygons, wherein the first virtual line segment is formed by the start point and the end point;
        determining a fast-moving path inside a start point polygon based on the start point and the intersection point of the first virtual line segment and the start point polygon, wherein the start point polygon is a polygon in which the start point is located;
        determining a fast-moving path inside an end point polygon based on the end point and the intersection point of the first virtual line segment and the end point polygon, wherein the end point polygon is a polygon in which the end point is located; and
        determining a fast-moving path between the start point polygon and the end point polygon, so that the fast-moving path between the start point polygon and the end point polygon, located outside a polygon in a first pseudo security area, is the shortest, wherein the first pseudo security area is an area not occupied by the start point polygon and the end point polygon on the horizontal plane; and
    when the first determining result indicates that only one of the start point and the end point is located in a polygon, the method further comprises the steps of:
        determining intersection points of a second virtual line segment and the polygon, wherein the second virtual line segment is formed by the start point and the end point;
        determining a fast-moving path inside an endpoint polygon based on the intersection points and the start point or end point in the endpoint polygon, wherein the endpoint polygon is a polygon in which the start point or the end point is located; and
        determining a fast-moving path between the endpoint polygon and the end point or start point outside the endpoint polygon, so that the fast-moving path located outside a polygon in a second pseudo security area is the shortest, wherein the second pseudo security area is an area not occupied by the endpoint polygon on the horizontal plane.

* * * * *